ELECTRICAL IMPULSE RECORDING AND PROJECTION SYSTEM

Filed July 14, 1966 2 Sheets-Sheet 1

Bernard Lichtenstein

INVENTOR

BY

ATTORNEY

ELECTRICAL IMPULSE RECORDING AND PROJECTION SYSTEM

Filed July 14, 1966 2 Sheets-Sheet 2

Bernard Lichtenstein
INVENTOR

BY Richard Whiting

ATTORNEY

United States Patent Office 3,401,398

Patented Sept. 10, 1968

3,401,398

ELECTRICAL IMPULSE RECORDING AND PROJECTION SYSTEM

Bernard Lichtenstein, North Massapequa, N.Y., assignor to Edo Corporation, College Point, N.Y., a corporation of New York Filed July 14, 1966, Ser. No. 565,164
12 Claims. (Cl. 346—107)

ABSTRACT OF THE DISCLOSURE

An electrical impulse recording and projection system which includes multiple channel light sources activated by electrical impulses, optical fibers for light transmission to a film for exposure of the film, developing means adjacent the film and including a source of infra-red rays for developing the exposed film, and projection means including light substantially free of rays which would further expose and develop the film.

This invention relates to an electrical impulse, light conversion and recording system. More particularly, the present invention relates to an electrical impulse light conversion, recording and transmission system employing optical fibers for transmission of light signals to a recording film which is developed for visual viewing of the recorded signals on a viewing screen.

The system of the present invention converts electrical signals to light which is directly recorded without reliance upon complex electrochemical or electromagnetic equipment and the recorded light is fixed as a permanent recording without reliance upon wet chemical developers, fixers or the like. In addition, the system of the present invention eliminates shortcomings of equipment which typically generate radio frequency interference.

It is an object of this invention, therefore, to provide a recording and transcribing system wherein an electrical impulse is converted to a light signal which is transmitted to and recorded on light-sensitive film for subsequent projection viewing.

It is also an object of this invention to provide an electrical signal recording and high resolution visual transcribing system for viewing recorded electrical signals.

It is another object of this invention to provide a high speed recording and transcribing system wherein electrical impulses are converted to and transmitted as light signals through optical fibers onto a recording film which is developed and, thereafter, the recorded image may be projected onto a screen for visual viewing and interpretation of the electrical impulses.

Figure 1:
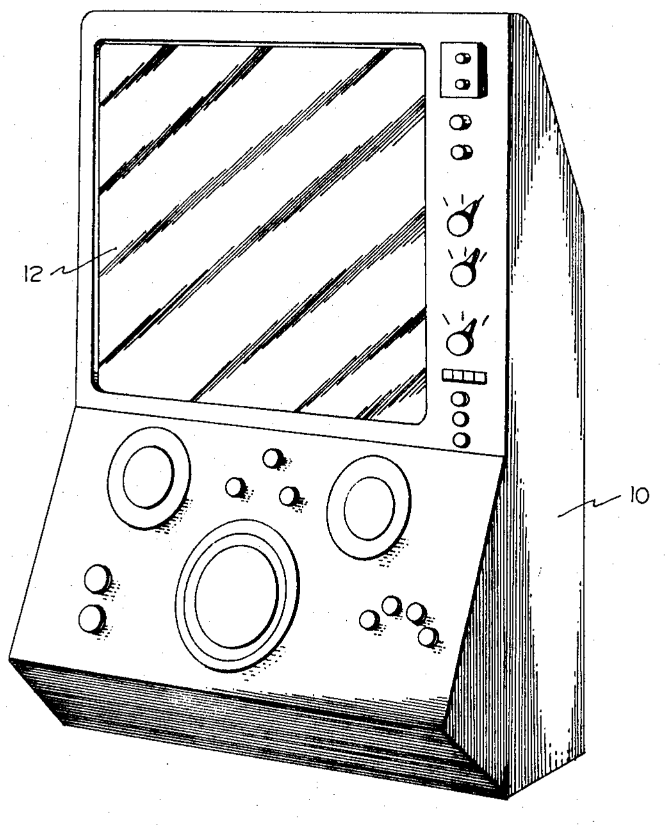
Figure 2:
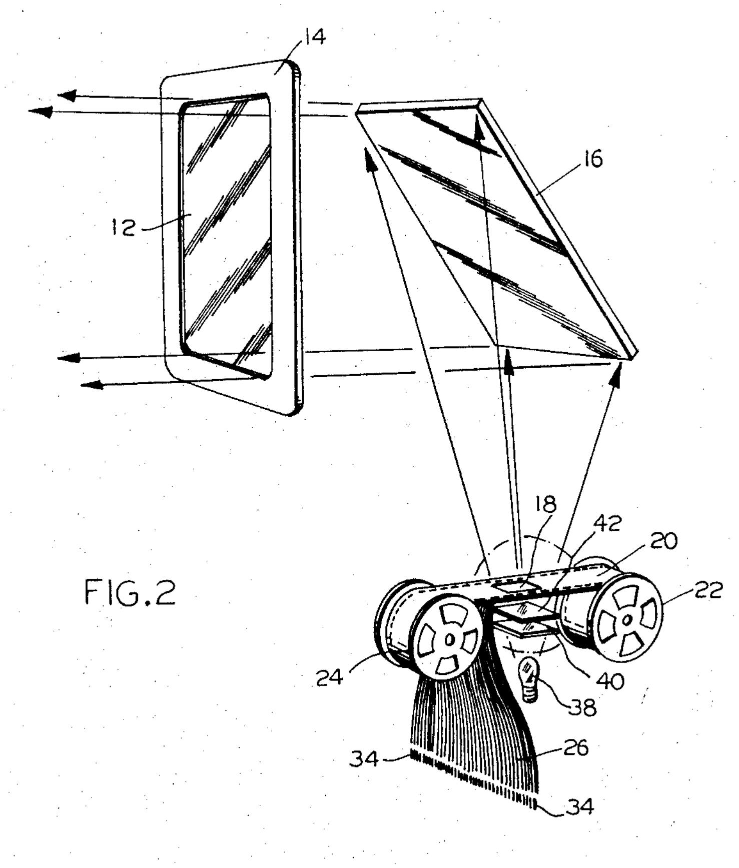
Figure 3:
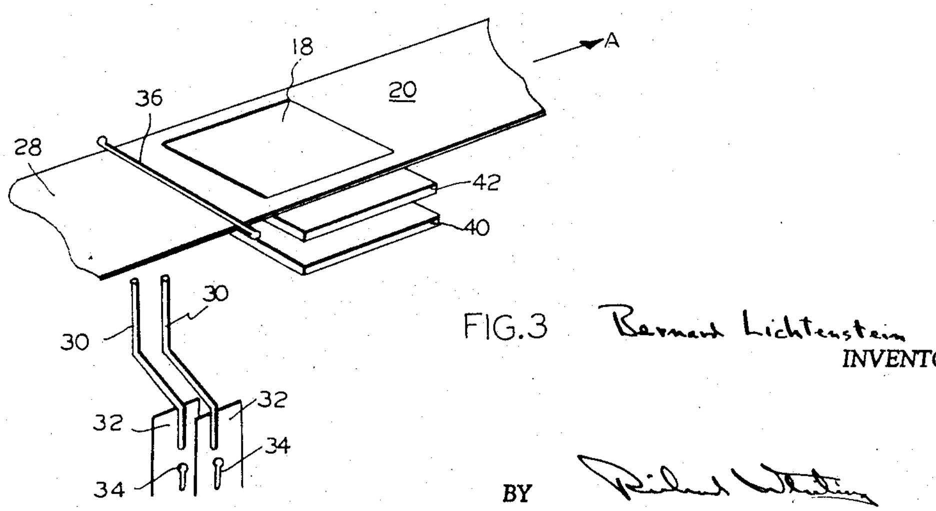

These and other objects and advantages of the present invention will become more apparent from the following detailed description taken in conjunction with the accompanying drawings in which:

FIG. 1 diagrammatically illustrates a console embodying the system of the present invention;

FIG. 2 diagrammatically illustrates the recording, developing, and projection sequence in the conversion of an electrical impulse to a visual image; and FIG. 3 illustrates more specifically the sequence depicted by the invention illustrated in FIG. 2.

It will be apparent that in the description hereinafter like elements will be referred to by similar numerals throughout the several views.

Referring to FIG. 1, there is illustrated console 10 having various controls and data indicators as desired, and etched glass screen 12 for receiving a projected image to be viewed.

Within console 10, as illustrated by FIG. 2, and enclosing etched glass screen 12, supported to console 10 is structural frame 14. Suitably positioned within console

10 is reflection plate 16 which reflects image 18 from film 20 through etched glass screen 12 for visual viewing or image interpretation. Film 20 may be readily contained in a compact cartridge or other suitable container having receiving reel 22 for the exposed and developed film and supply reel 24 containing the unexposed and undeveloped film. Film 20, unexposed and undeveloped from reel 24, is passed over optical fibers 26 from which light signals are received and recorded upon the film.

The sequence of operation of the present apparatus is more clearly illustrated in FIG. 3 wherein film 20 is shown traveling in the direction of arrow A to receiving reel 22. Unexposed film 28 is passed over optical fibers 30 which are disposed in any desired pattern beneath the film as well as in any desired number. For example, about 70 to about 100 optical fibers may be positioned beneath the undeveloped film and at a distance in relation to the film to avoid overlap of the transmitted light impulses from the optical fibers. The optical fibers are secured to individual light shields 32 at the light receiving end of the optical fibers. The light shields usefully limit undesirable transmission of light impulses through adjacent optical fibers. The light impulses originate from a suitable light source which may appear as pin lights 34 which are also secured to light shields 32 and in line with optical fibers 30. Pin lights 34 may be actuated by any desirable electrical system or combination of electrical systems to furnish electrical impulses which actuate pin lights 34 according to a pattern which will ultimately appear as a visual image projected onto the viewing screen.

After unexposed film 20 has received and recorded light impulses from optical fibers 30, the exposed film is passed beneath an infra-red source appearing in the figures as wire 36 which develops the exposed film and thereby permanently records the electrical signal transmitted through pin lights 34 and optical fibers 30 on the film. The recorded image on film 20 may be viewed by passing the developed film over light source 38 which projects light of sufficient intensity through light filter 40 and lens 42 onto reflecting surface 16. Light filter 40 is such as to filter either ultra-violet or infra-red rays, or, by a suitable filter or combination, both ultra-violet and infra-red rays, for purposes as will be described below. The reflected image is then transmitted to etched glass screen 12 for visual interpretation as desired. Alternate viewing means such as by an independent viewing screen or other surface may be used to receive the reflected image from surface 16 as desired.

The film processed through the present system may be usefully stored for subsequent viewing in conventional projection equipment, if desired, or may be stored to provide a permanent record of the recorded image presented by the electrical impulses received through optical fibers 30. Alternately, the system may be used for projection of, for example, stock market quotations or the like wherein only a single viewing is generally contemplated.

The electrical system which activates the light signals and generates light impulses through the optical fibers may be synchronized with auxiliary equipment or systems as desired such that a combination of electrical impulses from various systems may be transcribed and viewed from a single recorded film. The system may also be programmed to receive multi-color displays, movie picture images, or coded electrical impulses. Alternately, the combination of systems may receive an image which is converted to electrical impulses for transmission and then reconverted to light impulses for recording as previously described.

The film employed in the system of the present invention for receiving the impulses from the optical fibers is desirably a high intensity film which may be developed under a hot wire or other source of infra-red radiation.

The developed film may then be exposed to light filtered of infra-red rays, for projection of the recorded image either directly onto an etched glass screen or alternately by projection onto an enlarged screen where greater enlargements are permissible. The light beams employed for exposure, film developing and projection are desirably contained in separate optical frequency bands such that the three separate processes may take place in close physical proximity without mutual interference. For example, the film may be exposed under ultra-violet light rays in the vicinity of about 3500 to about 3900 Angstrom units after which the film may be developed under the red or infra-red section of the light spectrum at about 7200 Angstrom units and, thereafter, viewed between the violet and red section of the spectrum such as between 4000 and 7200 Angstrom units in the spectrum scale. In any event, the light used for projection is free of rays which would result in further development of the film.

The present system may also find application to recording impulses received from range recorders, depth recorders or the like as desired. Additional recording instruments may also be used in combination with the present system through intermediate electrical impulse transmission equipment. The system may also provide a useful image bearing time recorder for microfilm recordation.

It will be apparent that various additions and modifications will appear in the foregoing detailed description to one skilled in the art without departing from the spirit of the present invention as defined by the appended claims.

What is claimed is:

1. A system for conversion of electrical impulses to visual images and projection of said images, which comprises a plurality of light sources individually shielded from adjacent light sources; optical fibers disposed in light-receiving relationship to said light sources; means for supplying unexposed film over said optical fibers opposite the light receiving end thereof to expose the film; developing means including a source of infra-red rays adjacent said light exposed film for developing the exposed film to form visual images; and projection means for passing visible light, free of rays which would further expose and develop the film, through said developed film for viewing the visual images recorded on said film.

2. The system of claim 1 wherein exposure of the film is by ultra-violet light having a wave length below 3900 Angstrom units.

3. The system of claim 1 wherein the projected light for viewing of the developed image on said film is between a wave length of 4000 to 7200 Angstrom units.

4. The system of claim 1 wherein an ultra-violet filter is provided intermediate the light-projecting means and the film.

5. A system for translating electrical impulses to a visual image and for projecting the resulting image, which comprises a plurality of pin lights for translating electrical impulses to light signals; light shields disposed between adjacent pin lights to limit light transmission between adjacent pin lights; optical fibers each secured by one end to one of said light shields for receiving light impulses from said pin lights; an unexposed film supply means for supplying film over the opposite end of said optical fibers receiving light impulses from said pin lights; means for developing exposed film including a source of infra-red rays provided adjacent film exposed to said optical fibers; means for projecting visible light, free of light rays which would further expose and develop said film, through said developed film and onto a light reflecting surface for visible viewing of same; and film take-up means for receiving said viewed film.

6. The system as described in claim 5 wherein the film is exposed at about 3850 Angstrom units, developed at above 7200 Angstrom units and viewed at between 4000 and 7200 Angstrom units light.

7. The system as defined in claim 5 wherein the infra-red developing source is a heat producing wire disposed adjacent the surface of the exposed film.

8. An electrical impulse recording and projecting system for the conversion of electrical impulses into images upon film for subsequent projection and storage thereof, which comprises means for exposing a film, including in multiple, individuality shielded channels, a plurality of light sources activated by electrical impulses, and equal plurality of optical fibers each capable of conveying light from one light source to a position adjacent the film and projecting the light upon the film;

adjacent means for developing the film to form images, including a source of infra-red rays projecting upon the exposed film;

means for projecting said images, including a source of visible light substantially free of light rays which would further expose and develop the film; and means for providing and transporting unexposed film for exposure, developing and projection.

9. The system of claim 8, wherein a filter is provided to filter infra-red rays from said source of visible light for projecting said images.

10. The system of claim 8, wherein means are provided to supply only ultra-violet light for exposing the film, to supply only infra-red rays for developing the film, and to supply for projecting said images visible light filtered of ultra-violet or infra-red light.

11. The system of claim 8, wherein the infra-red developing source is a heat-producing wire disposed adjacent the surface of the exposed film.

12. The system of claim 11, wherein the ends of the optical fibers exposing the film and the heat-producing wire developing the exposed film are adjacent opposite surfaces of the film.

References Cited

UNITED STATES PATENTS

| | | | |
|---|---|---|---|
| 2,856,829 | 10/1958 | Orlando | 346—107 |
| 3,034,127 | 5/1962 | Walling et al. | 346—107 |
| 3,064,260 | 11/1962 | Heiland | 346—109 |

OTHER REFERENCES

Bennett, J. B., "Film Writer," IBM Tech. Disclosure Bulletin, vol. 3, No. 2, July 1960.

RICHARD B. WILKINSON, *Primary Examiner.*

E. C. SIMMONS, *Assistant Examiner.*